Dec. 10, 1940.                H. M. GREENE                2,224,785
                        EMERGENCY BRAKING DEVICE
                    Filed July 24, 1940           2 Sheets-Sheet 1

Inventor
Harry M. Greene

By Clarence A. O'Brien

Attorneys

Dec. 10, 1940.   H. M. GREENE   2,224,785
EMERGENCY BRAKING DEVICE
Filed July 24, 1940   2 Sheets-Sheet 2
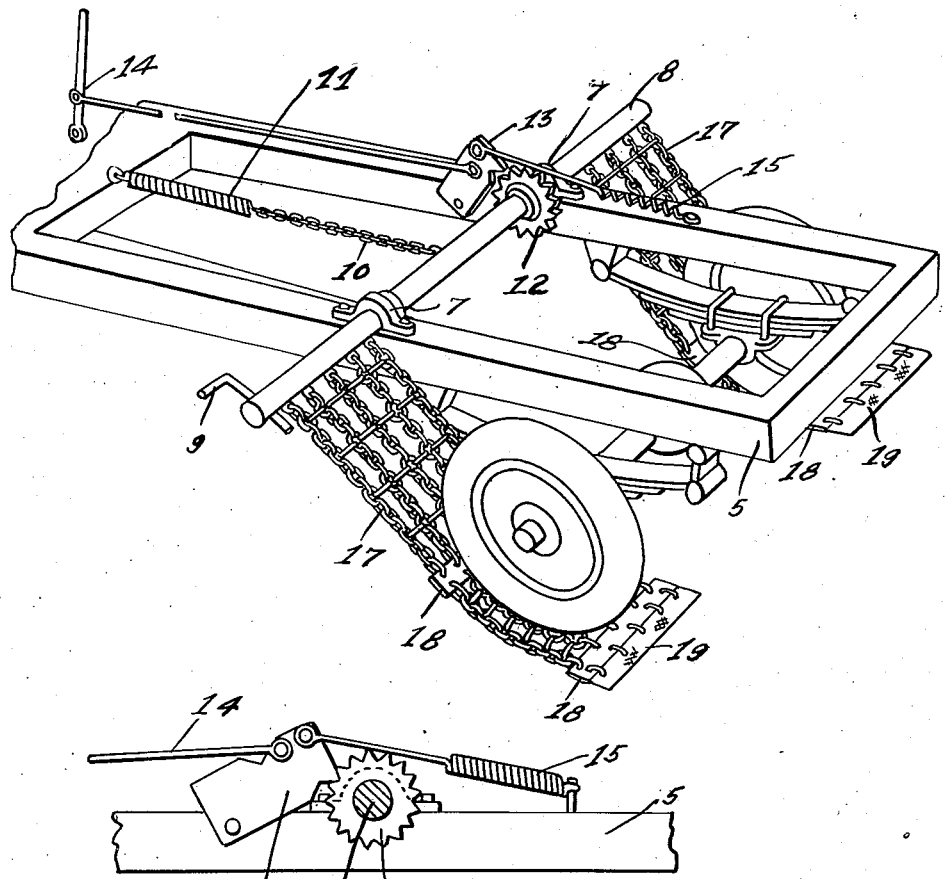
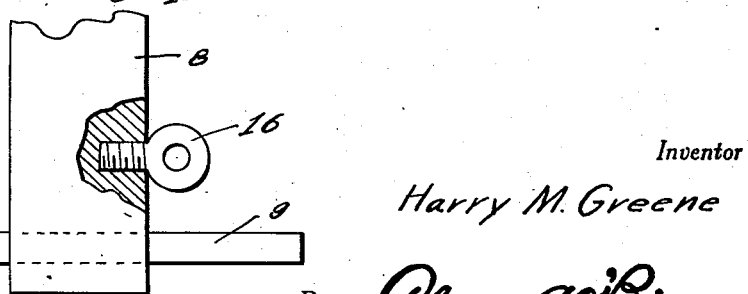
Inventor
Harry M. Greene
By *Clarence A. O'Brien*
Attorneys

Patented Dec. 10, 1940

2,224,785

UNITED STATES PATENT OFFICE 2,224,785

EMERGENCY BRAKING DEVICE

Harry M. Greene, Altoona, Pa.

Application July 24, 1940, Serial No. 347,289

4 Claims. (Cl. 188—4)

This invention relates to emergency braking devices for all types of motor vehicles only to be used in emergencies when the vehicle becomes uncontrollable by the ordinary brakes thereof, and has for the primary object the provision of a device of the above stated character which may be easily installed on a vehicle and quickly brought into use in case of emergency.

Another object of this invention is the provision of wear resisting traction mats and a mounting therefor including means whereby said mats may be brought into engagement with the road surface and under the vehicle wheels to check the rotation of said wheels and thereby bring about stopping of the vehicle within a comparatively short distance without the danger of skidding of the vehicle.

With these and other objects in view as will become more apparent as the description proceeds, the invention consists in certain other novel features of construction, combination and arrangement of parts as will be hereinafter more fully described and claimed.

For a complete understanding of my invention, reference is to be had to the following description and accompanying drawings, in which Figure 1 is a fragmentary perspective view illustrating a portion of a motor vehicle equipped with an emergency braking device constructed in accordance with my invention.

Figure 2 is a view similar to Figure 1 showing the traction mats in operative braking position.

Figure 4 is a fragmentary side elevation, partly in section, illustrating a ratchet mechanism.

Figure 5 is a fragmentary plan view, partly in section, illustrating a supporting shaft or drum and a crank handle applied thereto.

Figure 1:
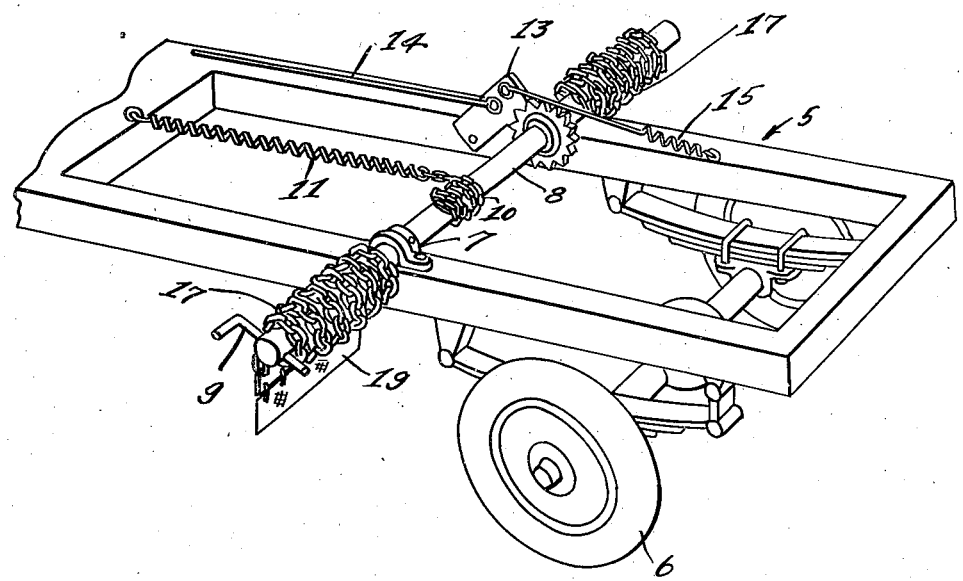
Figure 3:
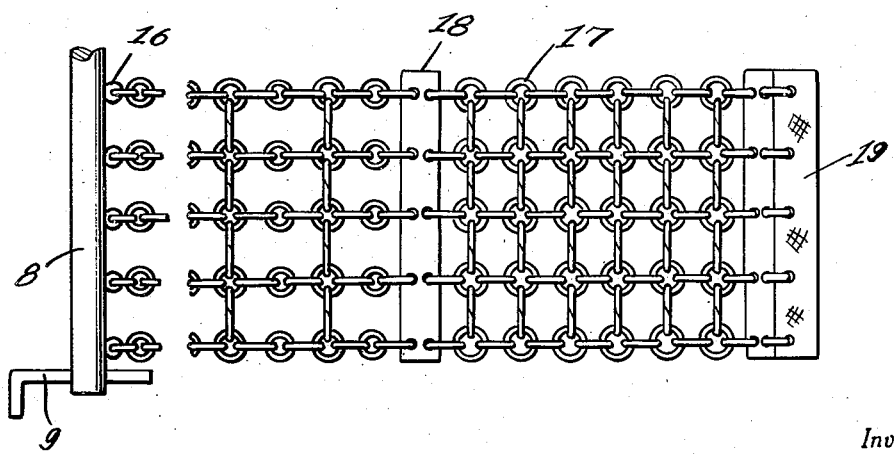
Figure 3 is a plan view illustrating one of the braking mats.

Referring in detail to the drawings, the numeral 5 indicates a fragmentary portion of a motor vehicle chassis in which the ground wheels are indicated by the character 6. Journals 7 are mounted on the chassis forwardly of the wheels 6 to rotatably support a shaft type drum 8 equipped at one end with a crank handle 9 for the manual rotation thereof. A flexible element 10 is secured to and wound on the shaft type drum and is connected to a coil spring 11 which is in turn connected to the chassis 5. The purpose of the flexible element 10 and the coil spring 11 is for the purpose of imparting rotation to the shaft type drum in one direction. A ratchet gear 12 is secured to the drum and is engaged by a holding dog 13 pivoted on the chassis for the purpose of preventing rotation of the drum under the influence of the spring 11.

A hand control 14 is connected to the dog 13 for disengaging the dog from the ratchet gear for the purpose of freeing the drum for rotation under the influence of the spring.

A spring 15 is connected to the dog 13 and the chassis 5 for the purpose of urging the dog into engagement with the ratchet gear.

Groups of eye bolts 16 are secured to the drum outwardly of the sides of the chassis and have connected thereto chain type mats 17 including transversely arranged rigid spreaders 18. Fabric flaps 19 are connected to the ends of the mats. Normally the mats are rolled on the drum, as shown in Figure 1, with the spring 11 under tension. In case of emergency, the operator actuates the control lever 14 to disengage the dog 13 from the ratchet gear and the spring 11 acts to rotate the drum to unwind therefrom the mats so that they may fall into engagement with the ground directly in front of the wheels of the vehicle. The wheels engage with the flaps 19 and draw the mats under the wheels and thereby check rotation of the wheels and bring about stopping of the vehicle without danger of skidding.

It is preferable that each mat be constructed of open type links so that quick repairs may be made thereto.

A device of the character described and shown in the drawings will obviate many serious accidents caused by vehicles getting out of control when descending steep grades and are unable to be checked in speed by the ordinary brakes thereof, consequently rendering a large saving in cost of operation of vehicles as well as a saving in lives.

It is to be understood that after the device has been placed in use and served its purpose, the vehicle may be elevated to free the mats from under the wheels and the mats may then be wound onto the drums by simply rotating the crank handle 9.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a device of the character described, a drum journaled on a chassis of a motor vehicle, spring means acting on said drum for the rotation thereof in one direction, a manually controlled ratchet mechanism for restraining the drum against rotation under the influence of said spring means, and traction mats secured to and wound on said drum to be lowered by the rotation thereof under the influence of the spring means to engage with a road surface under wheels of the vehicle.

2. In a device of the character described, a drum journaled on a chassis of a motor vehicle, spring means acting on said drum to rotate the latter in one direction, a ratchet mechanism for said shaft to restrain the rotation thereof under the influence of said spring means, a manually operated control for said ratchet mechanism, and flexible wear resisting traction mats secured to and wound on said drum for lowering into engagement with the ground and under wheels of the vehicle by the rotation of the drum under the influence of said spring means.

3. In a device of the character described, a drum journaled on a chassis of a motor vehicle, spring means acting on said drum to rotate the latter in one direction, a ratchet mechanism for said shaft to restrain the rotation thereof under the influence of said spring means, a manually operated control for said ratchet mechanism, flexible wear resisting traction mats secured to and wound on said drum for lowering into engagement with the ground and under wheels of the vehicle by the rotation of the drum under the influence of said spring means, fabric flaps connected with said mats and each mat including chain construction provided with rigid spreaders.

4. In a device of the character described, a drum journaled on a chassis of a motor vehicle, spring means acting on said drum to rotate the latter in one direction, a ratchet mechanism for said shaft to restrain the rotation thereof under the influence of said spring means, a manually operated control for said ratchet mechanism, flexible wear resisting traction mats secured to and wound on said drum for lowering into engagement with the ground and under wheels of the vehicle by the rotation of the drum under the influence of said spring means, fabric flaps connected with said mats and each mat including chain construction provided with rigid spreaders, said flaps being connected with certain of said spreaders, and a crank handle secured to the drum for the rotation thereof manually to wind the mats on said drum.

HARRY M. GREENE.